United States Patent
Gathmann et al.

[11] 3,890,102
[45] June 17, 1975

[54] CATALYTIC ACTION GAS GENERATOR

[75] Inventors: Dietrich Gathmann, Bremen; Walter Mayland, Moordeich, Bremen, both of Germany

[73] Assignee: ERNO Raumfahrttechnik GmbH, Bremen, Germany

[22] Filed: Dec. 13, 1972

[21] Appl. No.: 314,765

[30] Foreign Application Priority Data
Dec. 31, 1971   Germany............................ 2165883

[52] U.S. Cl.................................. 23/282; 23/288 R
[51] Int. Cl............................................. B01j 7/02
[58] Field of Search.................... 23/282, 281, 288 R

[56] References Cited
UNITED STATES PATENTS

| | | | |
|---|---|---|---|
| 254,189 | 2/1882 | Berland | 23/282 X |
| 436,812 | 9/1880 | Tallmadge | 23/281 X |
| 3,298,182 | 1/1967 | Webb | 23/288 R |
| 3,393,983 | 7/1968 | Washington | 23/282 X |
| 3,585,007 | 6/1971 | Gross | 23/282 |
| 3,615,252 | 10/1971 | Di Pietro | 23/282 |
| 3,736,104 | 5/1973 | Churchill et al. | 23/281 |

*Primary Examiner*—Joseph Scovronek
*Assistant Examiner*—Arnold Turk
*Attorney, Agent, or Firm*—Ralf H. Siegemund

[57] ABSTRACT

A catalytic action gas generator has a pressure vessel storing liquid to be decomposed by a catalyst. The latter is contained in a container inside of the vessel. The container has a destructible bottom and an outlet tube at the other end. The catalyst has consistency to define a tortuous flow path into which the liquid is driven by high pressure that develops shortly after contact between catalyst and decomposing liquid is permitted through the destroyed container bottom.

3 Claims, 3 Drawing Figures

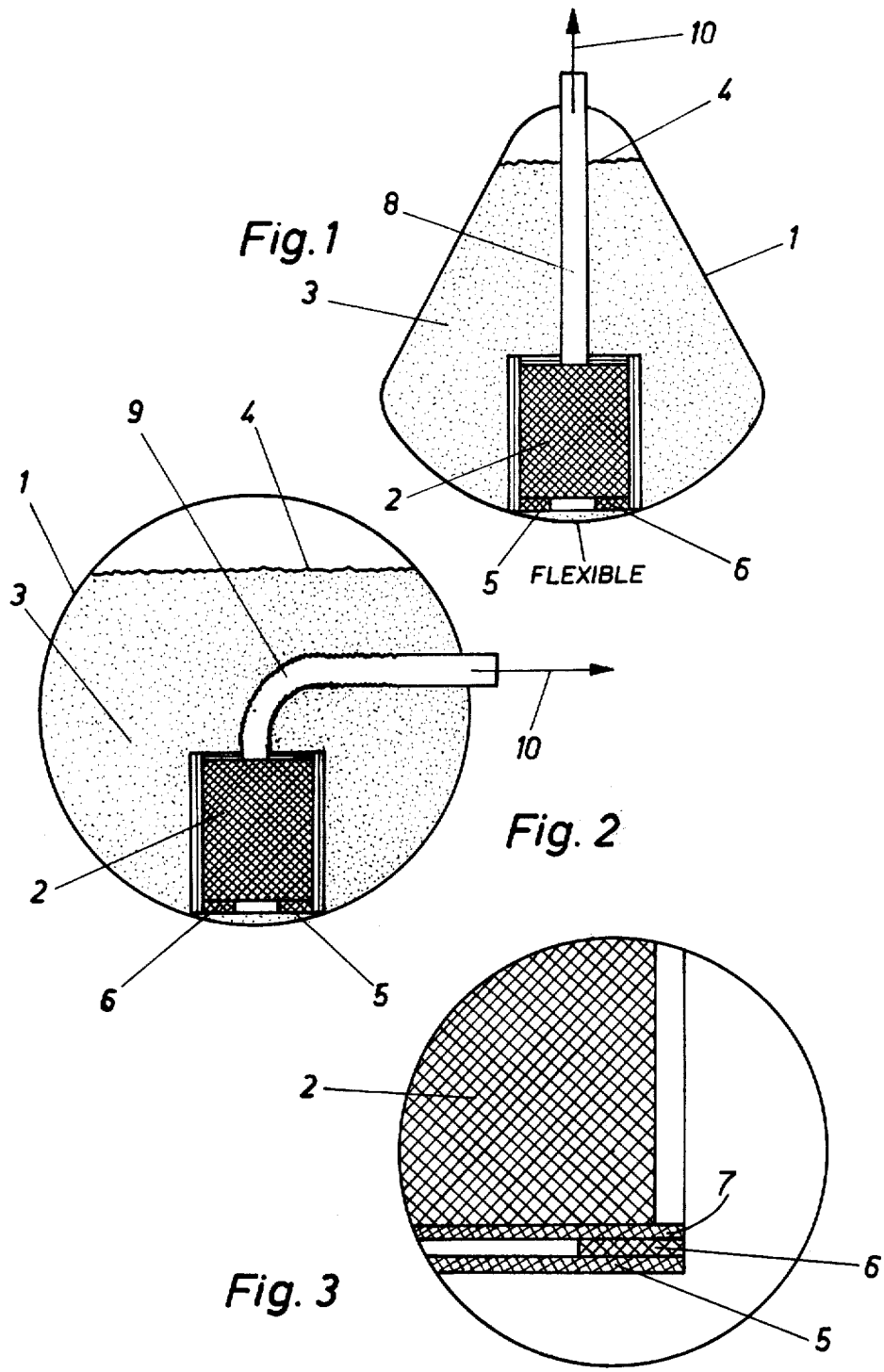

CATALYTIC ACTION GAS GENERATOR

BACKGROUND OF THE INVENTION

The present invention relates to a gas generator for producing a particular quantity of gas by means of catalytic decomposition of a liquid. More particularly, the invention relates to a gas generator producing gas serving also as driving agent for the liquid to sustain the gas production.

Gas generators of the type referred to above are known in general. They operate, for example, by using a hydrazine or a hydrazine mixture as liquid substance and bringing the liquid into contact with a catalytic material whenever needed. The liquid is stored in a container, and predetermined quantities are injected into a catalytic bed. The catalyst decomposes the injected liquid so that gas develops. The liquid may be decomposed to develop hydrogen, nitrogen and ammonium. The relative proportions of these gases depend on the pressure that develops as well as on the configuration of the catalyst.

Several methods are known here in general. In accordance with one method, an auxiliary but inert gas is depressurized to some extent in a pressure regulator and the pressure regulated gas is used to drive the liquid into a catalyst for development of (other) gas therein by catalytic reaction. In accordance with a simpler method, an auxiliary, pressurized gas is just maintained above the liquid to be decomposed and drives that liquid into the catalyst. Of course, the driving power decreases as the decomposing liquid decreases in volume, resulting in a corresponding increase in volume for the propellant gas; the latter depressurizes accordingly. As a consequence, there is a steady decrease in developed gas (and gas pressure) by catalytic reaction.

In accordance with another known method, the gas that develops by catalytic reaction is used indirectly to sustain driving pressure for the liquid into the catalyst. The gas acts on the large surface of a differential piston, whose small surface acts on the liquid and, thus, drives the latter into the catalyst.

These several methods have several disadvantages. The first method requires two separate containers plus pressure regulation which is heavy equipment and expensive. The second method is rather poor because of the steady decrease in gas development. The last method is again quite expensive because of the piston arrangement. It should be born in mind that the development of gas by catalytic reaction is often required under circumstances that preclude complicated apparatus. Moreover, this process was developed as a simple source for a limited quantity of gas. Complicated equipment may defeat the purpose here. Examples of use are inflatable rafts, life boats, buoys or the like. The fact that the second method does not provide constant pressure flow may not per se be of disadvantage, except that the auxiliary pressure must be so high that even after decomposition of the liquid, the residual pressure is still sufficiently high so that the desired pressure can develop in the destination volume for the gas. That, in turn, requires an excessive initial pressure of the auxiliary gas or a very large container for it.

SUMMARY OF THE INVENTION

It is an object of the present invention to provide a simply constructed gas generator in which the gas flow is substantially constant for the duration of production and whereby the developed gas serves as a propellant to drive the liquid into the catalyst for sustaining the reaction.

In accordance with the preferred embodiment of the invention, it is suggested to fill a closed container or vessel with the liquid to be decomposed, but without pressurizing same. A relatively small container for the catalyst is disposed in the vessel with a destructible wall portion, e.g. the bottom. The vessel must be amenable to manipulation from the exterior that is effective in the interior so as to permit destruction of the said wall portion whenever needed without direct access to the interior, i.e., without causing an escape path for fluid to develop from the interior of the vessel.

The catalyst is provided in, generally, porous consistency, such as a packed bed of granular substance or as a sintered part, constituting a tortuous path for any fluid and resulting in rather significant pressure loss upon through-flow. The wall of that catalyst container opposite the destructible wall leads to an exit duct which, in turn, leads out of the entire apparatus for connection to the object to be pressurized.

Upon destruction of the bottom of the catalyst container, liquid contacts the catalyst to develop gas. The pressure in the vessel will increase until sufficiently high for driving gas through the porous catalyst. That same internal pressure drives also liquid into the catalyst bed so that the catalytic reaction is sustained under equilibrium conditions in which the pressure in the vessel remains essentially constant until substantially all liquid has been driven into the bed and decomposed.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross section through a gas generator in accordance with a first example for the preferred embodiment of the invention;

FIG. 2 is a cross section in accordance with another example; and

FIG. 3 illustrates a cross section detail applicable to both examples of FIGS. 1 and 2.

Proceeding now to the detailed description of the drawings, FIG. 1 illustrates a more or less pear-shaped vessel 1 which is sufficiently strong for sustaining substantial pressure, but may be flexible or may have a flexible bottom. A liquid 3 to be decomposed is contained in the vessel with a level 4 above which normal vapor pressure prevails.

A container 2 is disposed in the vessel, having bottom which is constructed as a rather easily destructible plate 5. The bottom 5 may be made of glass or an aluminum foil. If the bottom portion of vessel 1 is flexible, it can be indented so as to permit destruction of the bottom plate 5 of container 2 from the outside and without requiring direct access thereto. Alternatively, the bottom of container 1 may have a bellow-like insert with an internal puncture stud that can be pressed into bottom 5 by manual action from the outside.

A diaphragm 6 is disposed above bottom 5 and forms part of container 2. The diaphragm has a rather exactly predetermined aperture as a flow passage for liquid. The aperture width determines the area of the inlet to container 2 which is also the area of contact between catalyst and liquid after destruction of bottom 5. If necessary, the diaphragm may be adjustable even after incorporation in the apparatus, and, if the vessel 1 is flexible, the diaphragm may readily be manipulated from the outside. It will become apparent that this way the rate of gas development can be controlled.

A catalyst having packed granular consistency, or being a sintered porous body, is contained inside of container 2. A sieve 7 may be disposed above diaphragm 6, and the catalyst bed fills container 2 above that sieve or mesh. The catalyst bed may be covered with another sieve and a lid covers the container. A tube 8 terminates in the lid and is open above the catalyst bed. The inlet side of tube 8 serves as an outlet for container 2. The tube leads straight up and penetrates the top of vessel 1. Tube 8 is connected to (or can be connected to) an external device which is to be pressurized by means of 10.

FIG. 2 illustrates a somewhat modified version for a gas generator. The vessel 11 is spherical, and the tube 9 between catalyst container and exterior is flexible. The container 2 just sits on the portion of sphere that happens to be the bottom. Due to the flexibility of tube 9, container 2 will always seek the lowest point and support area in container 11 to rest on. This way the operation of the device remains rather independent from the specific direction along which tube 9 leaves the vessel.

The generators shown in FIGS. 1 or 2 will be used, e.g., for inflating rafts, life boats buoys or the like.

The generators operate as follows. Upon destroying partition 5, liquid enters into contact with the catalyst as now exposed in the bottom portion of the porous bed, through diaphragm 6. Immediately some gas develops by catalytic reaction. The gas has two paths open at this point; one is around the container 2 and up through the liquid in the vessel 1 to the surface level 4 therein; the other one runs through the catalyst in container 2, up and out through pipe 8. As far as counter pressure is concerned, it is the same for both paths as liquid 3 is not normally pressurized. However, the flow resistance through the catalyst bed is significantly larger than through liquid 3 so that the gas will bubble up and accumulate above level 4.

Since the vessel is closed above level 4, the pressure will increase as gas develops and accumulates in the top of vessel 1. As a consequence, the liquid is pressurized and driven into the catalyst. Since more liquid is, thus, brought into contact with catalyst, catalytic reaction is sped-up and gas development increases. Soon the gas accumulation as augmented by vigorous gas production will cause internal pressure which is sufficiently large so as to overcome the flow resistance through the catalyst and gas will flow through pipe 8 out of the generator.

As soon as gas flows out of the system, a new state of equilibrium is obtained. Gas will escape at the rate it is produced. The gas pressure in the vessel continues to drive liquid into the container 2 and gas will be driven towards and escape through the top thereof and tube 8. It should be noted that the internal pressure does not continuously increase in vessel 1 (or 11), because the initial increase of gas pressure causes liquid to be driven more into the container. The liquid penetrates deeper into the catalyst bed and will to lesser and lesser extent send its gas back down into the vessel. That process slows the development of pressure increase in the vessel so that indeed a state of equilibrium can be obtained and will be maintained, in which just enough gas develops and flows into the vessel to maintain a needed driving pressure overcoming the flow resistance and pressure drop in and through the catalyst. Gas development continues at a constant pressure level until substantially all liquid has been decomposed, or until the back pressure from device 10 offsets the pressure of the generator as developed at the exit of tube 8 or 9.

The state of equilibrium for sustaining gas production is defined by a sufficiently high driving pressure above level 4, so that gas as developed is pressurized to be driven through the tortuous path in the porous catalyst. The desired internal pressure for the operation is determined essentially by the flow resistance and that is determined by the length of the path through the catalyst, its porosity and by the diaphragm. The latter is the easiest to adjust and permits rather fine trimming in the adjustment of operation. It should be considered here that the liquid should be driven deep into the catalyst to increase the effective area of contact with the liquid. The width of the container is a parameter here.

It should also be mentioned that in the final phases full pressurization of the object may readily result as under more or less quasi stationary conditions, the pressure in object 10 and vessel 1 will equalize.

The invention is not limited to the embodiments described above but all changes and modifications thereof not constituting departures from the spirit and scope of the invention are intended to be included.

We claim:

1. Apparatus for generating gas by catalytic decomposition of a liquid, comprising:

a pressure vessel with a completely closed interior containing the liquid, the liquid having a particular surface level in the vessel;

a container disposed inside of the vessel and having an inlet disposed near the bottom of the vessel, below said level, the container further having an outlet and containing a catalytic substance defining a tortuous path between the inlet and the outlet, and having substantial resistance to flow of gas therethrough, whereby significant pressure is needed to drive the liquid into and through the catalyst, the inlet being normally covered by a breakable partition separating the interior of the container from its outside, which is the interior of the vessel, the partition being destructible;

means included in the pressure vessel and being accessible from the outside of the vessel for effecting destruction of said partition from the outside of the vessel and without having to open the vessel so that upon destruction of the partition the catalyst is exposed to the liquid as entering the container through the inlet and contacting the catalyst so that gas develops adjacent the inlet, and accumulates above said surface level in the vessel and pressurizes the interior of the vessel; and an outlet duct for the container connected to the outlet thereof and leading also out of the vessel, so that gas developed on contact of the liquid with the catalyst and having passed through said tortuous path may discharge, the accumulated gas inside of the vessel acting as propellant for driving liquid into the catalyst to sustain development of gas and discharge of such gas through the outlet duct.

2. Apparatus as in claim 1, the partition and inlet being in the bottom of the container, said bottom having position close to or on the bottom of the vessel, said duct being flexible and the bottom of the vessel being curved to accommodate changes in orientation of the container in the vessel, the bottom of the container being covered by liquid for any orientation of the pressure vessel.

3. Apparatus as in claim 1, wherein the catalyst is sintered or granular.

* * * * *